(12) United States Patent
Mori et al.

(10) Patent No.: US 12,313,482 B2
(45) Date of Patent: May 27, 2025

(54) SENSOR SYSTEM, SENSING METHOD, AND PROGRAM

(71) Applicant: Panasonic Intellectual Property Management Co., Ltd., Osaka (JP)

(72) Inventors: Takeshi Mori, Osaka (JP); Toshio Yamazaki, Fukui (JP); Isao Hattori, Fukui (JP); Hirotsugu Suzuki, Ishikawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 340 days.

(21) Appl. No.: 17/919,470

(22) PCT Filed: Feb. 8, 2021

(86) PCT No.: PCT/JP2021/004542
§ 371 (c)(1),
(2) Date: Oct. 17, 2022

(87) PCT Pub. No.: WO2021/215077
PCT Pub. Date: Oct. 28, 2021

(65) Prior Publication Data
US 2023/0204442 A1    Jun. 29, 2023

(30) Foreign Application Priority Data

Apr. 21, 2020 (JP) .................................. 2020-075698
Jul. 2, 2020 (JP) .................................. 2020-115186

(51) Int. Cl.
G01L 1/26    (2006.01)
G01L 25/00   (2006.01)
G01P 21/00   (2006.01)

(52) U.S. Cl.
CPC ................ G01L 1/26 (2013.01); G01L 25/00 (2013.01); G01P 21/00 (2013.01)

(58) Field of Classification Search
CPC . G01L 1/26; G01L 25/00; G01P 21/00; G01P 15/125; G01P 15/18
See application file for complete search history.

(56) References Cited

U.S. PATENT DOCUMENTS

2010/0122565 A1   5/2010   Miller et al.
2014/0058617 A1   2/2014   Nakamura et al.
(Continued)

FOREIGN PATENT DOCUMENTS

JP    2014-041032 A    3/2014
WO    2015/072090 A1   5/2015
(Continued)

OTHER PUBLICATIONS

International Search Report dated Apr. 27, 2021 issued in International Patent Application No. PCT/JP2021/004542, with English translation.

*Primary Examiner* — Lisa M Caputo
*Assistant Examiner* — Cynthia L Davis
(74) *Attorney, Agent, or Firm* — Rimon P.C.

(57) ABSTRACT

A sensor system includes a sensor element, a signal processing circuit, and a pseudo-signal correction circuit. The sensor element outputs an electric signal corresponding to an external force. The signal processing circuit converts the electric signal coming from the sensor element into a signal having a certain signal format and then outputs the signal thus converted. The pseudo-signal correction circuit corrects a pseudo-signal outputted by the sensor element. When receiving a test signal, the sensor element performs a self-diagnosis based on the test signal and then outputs the pseudo-signal, which represents a result of the self-diagnosis. The pseudo-signal correction circuit corrects the pseudo- (Continued)

signal based on environment information about an environment where at least one of the sensor element or the signal processing circuit is located.

8 Claims, 9 Drawing Sheets

(56) References Cited

U.S. PATENT DOCUMENTS

| | | |
|---|---|---|
| 2016/0187136 A1 | 6/2016 | Murakami et al. |
| 2017/0191830 A1 | 7/2017 | Maeda et al. |
| 2020/0264210 A1* | 8/2020 | Dakshinamurthy .... G01P 15/08 |

FOREIGN PATENT DOCUMENTS

| | | |
|---|---|---|
| WO | 2015/178117 A1 | 11/2015 |
| WO | WO-2017072897 A1 * | 5/2017 |
| WO | 2018/155057 A1 | 8/2018 |

* cited by examiner

SENSOR SYSTEM, SENSING METHOD, AND PROGRAM

CROSS-REFERENCE OF RELATED APPLICATIONS

This application is the U.S. National Phase under 35 U.S.C. § 371 of International Patent Application No. PCT/JP2021/004542, filed on Feb. 8, 2021, which in turn claims the benefit of Japanese Patent Application No. 2020-075698, filed on Apr. 21, 2020, and Japanese Patent Application No. 2020-115186, filed on Jul. 2, 2020, the entire disclosures of which Applications are incorporated by reference herein.

TECHNICAL FIELD

The present disclosure generally relates to a sensor system, a sensing method, and a program, and more particularly to a sensor system, a sensing method, and a program, all of which having or using a sensor element and a signal processing circuit.

BACKGROUND ART

Acceleration detecting apparatuses having a fault diagnosis function have been known (refer to Patent Literature 1).

Patent Literature 1 includes a plurality of acceleration sensors having different characteristics and installed on a vehicle, a function of inputting, when the vehicle is at a stop, diagnose signals to the sensors and diagnosing the output of the each of the plurality of acceleration sensors having different characteristics and diagnosing a fault detection function, and a function of determining, when the vehicle is travelling, that one of the acceleration sensor outputs is within a certain range and performing a fault detection by comparing a plurality of sensor outputs coming from the plurality of sensors having different characteristics.

According to Patent Literature 1, an excellent fault detection function is provided for the acceleration sensors to be installed in a vehicle.

Meanwhile, examples of the function of diagnosing the fault detection includes a function of allowing a sensor element to perform a self-test (to perform a self-diagnosis of the sensor element). A pseudo-signal obtained by the self-test enables calculating the sensitivity or the offset of the sensor element. However, the pseudo-signal depends on an environment where a sensor element or a signal processing circuit is located. Therefore, the pseudo-signal is lower in precision compared to the correction for the sensitivity or the offset.

CITATION LIST

Patent Literature

Patent Literature 1: JP 2014-41032 A

SUMMARY OF INVENTION

In view of the foregoing background, an object of the present disclosure is to provide a sensor system, a sensing method, and a program, all of which are configured or designed to improve precision of a pseudo-signal obtained by a self-test.

A sensor system according to one aspect of the present disclosure includes a sensor element, a signal processing circuit, and a pseudo-signal correction circuit. The sensor element is configured to output an electric signal corresponding to an external force. The signal processing circuit is configured to convert the electric signal coming from the sensor element into a signal having a certain signal format and output the signal thus converted. The pseudo-signal correction circuit is configured to correct a pseudo-signal outputted by the sensor element. The sensor element is configured to perform, when receiving a test signal, a self-diagnosis based on the test signal, and then output the pseudo-signal, which represents a result of the self-diagnosis. The pseudo-signal correction circuit is configured to correct the pseudo-signal based on environment information about an environment where at least one of the sensor element or the signal processing circuit is located.

A sensing method according to another aspect of the present disclosure includes: outputting, by a sensor element, an electric signal corresponding to an external force; converting, by a signal processing circuit, the electric signal coming from the sensor unit into a signal having a certain signal format and outputting the signal thus converted; and correcting, by a pseudo-signal correction circuit, a pseudo-signal outputted from the sensor element. The sensing method includes correcting, by the sensor element, the pseudo-signal based on environment information about an environment where at least one of the sensor element or the signal processing circuit is located.

A program according to still another aspect of the present disclosure is a program that is designed to cause a computer to perform the sensing method.

DESCRIPTION OF EMBODIMENTS

Note that the embodiments and their variations to be described below are only exemplary embodiments of the present disclosure and their variations and should not be construed as limiting. Rather, the exemplary embodiments and their variations may be readily modified in various manners depending on a design choice or any other factor without departing from a true spirit and scope of the present disclosure.

EMBODIMENT

A sensor system 1 according to the present embodiment will be described with reference to FIG. 1-FIG. 9F.

(1) Overview

Figure 1:
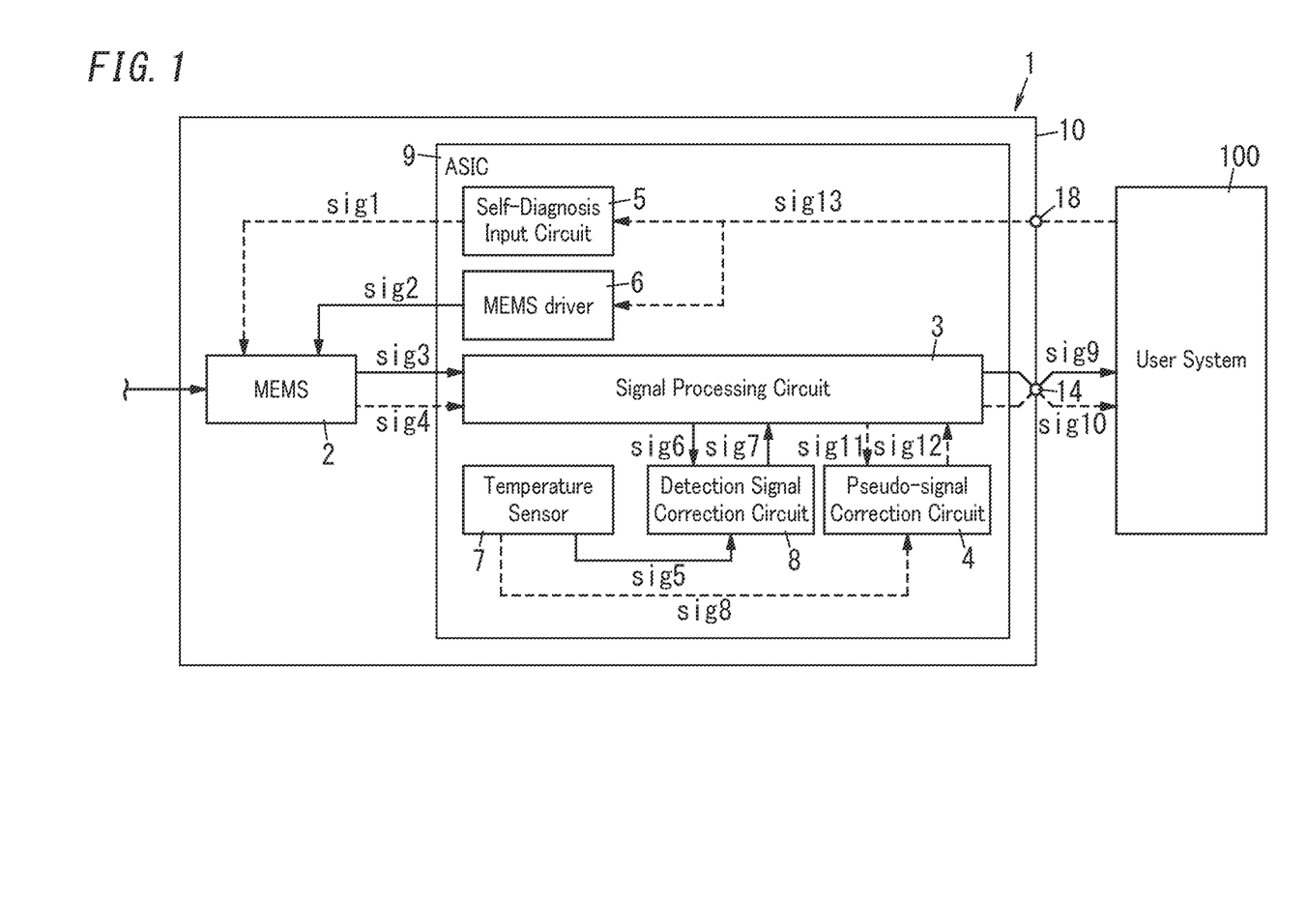
FIG. 1 illustrates a configuration of a sensor system according to an embodiment.

A sensor system 1 according to the present embodiment includes a semiconductor package 10. The sensor system 1 measures an external force F and converts it into an electric signal, and outputs the electric signal to a user system 100. Here, it is assumed that the external force F is an inertial force such as acceleration or vibration. The sensor system 1 may be a transducer that converts physical quantity such as an inertial force into an electric signal.

The semiconductor package 10 includes an interface for use to transmit or receive electric signals to or from the user system 100. The semiconductor package 10 is connected to the user system 100 via an input port 18 and an output-related port 14.

The semiconductor package 10 includes an application specific integrated circuit (ASIC) 9 and a Micro Electro Mechanical Systems (MEMS) element as a sensor element 2. Hereinafter, the sensor element 2 will be referred to as a MEMS element 2. The MEMS element 2 serves as a sensor that measures an inertial force such as acceleration and an external force F such as angular acceleration to output a detection signal. Furthermore, the MEMS element 2 is driven, in response to the reception of the test signal, to output a pseudo-signal, which is a self-diagnosis response. That is to say, the MEMS element 2 can perform a self-test.

Figure 2:
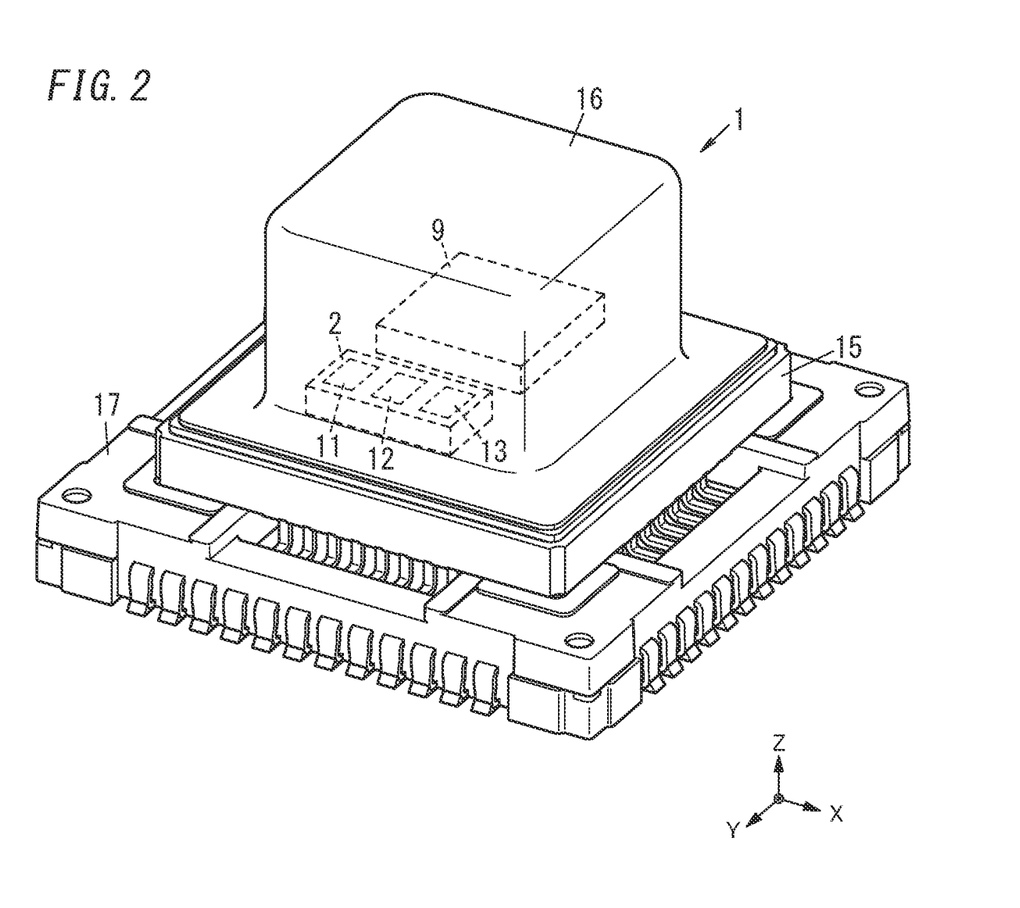
FIG. 2 illustrates an appearance of the sensor system.

The appearance of the sensor system 1 according to the present embodiment is shown in FIG. 2. The ASIC 9 and the MEMS element 2 are fixed to a base 15. The MEMS element 2 is covered with a case 16. In addition, the base 15, on which the MEMS element 2 and the ASIC 9 are installed, is installed on an auxiliary member 17. The auxiliary member 17 is composed of resin-molded wires and serves as wiring for electrodes or an absorber for the sensor system 1.

(2) Configuration

The configuration of the sensor system 1 will be described with reference to FIG. 1. The sensor system 1 includes the semiconductor package 10.

The semiconductor package 10 includes the MEMS element 2 and the ASIC 9.

The MEMS element 2 outputs an electric signal corresponding to an external force. According to the present embodiment, the MEMS element 2 is an inertial sensor that can detect an inertial force. The MEMS element 2 includes, as shown in FIG. 2, a first inertial sensor element 11, a second inertial sensor element 12, and a third inertial sensor element 13. The first inertial sensor element 11 detects an inertial force along X-axis as a first detection axis. The second inertial sensor element 12 detects an inertial force along Y-axis as a second detection axis perpendicular to the first detection axis. The third inertial sensor element 13 detects an inertial force along Z-axis as a third detection axis perpendicular to the first detection axis and the second detection axis. The MEMS element 2 outputs a pseudo-signal by using an output result of at least one of the first inertial sensor element 11, the second inertial sensor element 12, or the third inertial sensor element 13.

The MEMS element 2 also outputs a detection signal by using an output result of at least one of the first inertial sensor element 11, the second inertial sensor element 12, or the third inertial sensor element 13.

According to the present embodiment, the MEMS element 2 uses the first inertial sensor element 11, the second inertial sensor element 12, and the third inertial sensor element 13 to output a pseudo-signal and a detection signal from each of the inertial sensor elements.

Specifically, in the MEMS element 2, the first inertial sensor element 11, the second inertial sensor element 12, and the third inertial sensor element 13 are independent from each other. More specifically, the MEMS element 2 outputs a detection signal and a pseudo-signal for each of X-axis, Y-axis, and Z-axis.

Hereinafter, with reference to a detection signal and pseudo-signal to be outputted from one of the first inertial sensor element 11, the second inertial sensor element 12, and the third inertial sensor element 13, constituent elements will be described.

The MEMS element 2 measures an external force F and outputs a detection signal sig3, which is an electric signal. Specifically, the MEMS element 2 receives, from a later-described MEMS driver 6, a MEMS drive signal sig2 to drive the MEMS element 2. When receiving the external force F, the MEMS element 2 detects the external force F. The MEMS element 2 superimposes the displacement amount on the MEMS drive signal sig2 that has been supplied from the ASIC 9 and normalize the superimposed signal, and outputs it as the detection signal sig3 to a signal processing circuit 3.

The MEMS element 2 is also configured to perform a self-diagnosis (self-test). Specifically, in the self-diagnosis, the MEMS element 2 receives, from the ASIC 9, electrostatic attraction, a specific voltage pulse, or another signal, as a test signal sig1. The MEMS element 2 generates a pseudo response signal corresponding to the received signal. The MEMS element 2 outputs the pseudo response signal as a pseudo-signal sig4 to the signal processing circuit 3.

The ASIC 9 includes, as shown in FIG. 1, the signal processing circuit 3, a pseudo-signal correction circuit 4, a self-diagnosis input circuit 5, a MEMS driver 6, an environment sensor 7, and a detection signal correction circuit 8.

The ASIC 9 receives a selection signal sig13 from the user system 100 via the input port 18. The selection signal sig13 selectively indicates, as an input destination, either one of the self-diagnosis input circuit 5 or the MEMS driver 6. If the selection signal sig13 indicates selecting the self-diagnosis input circuit 5 as the input destination, the selection signal sig13 will be input to the self-diagnosis input circuit 5. If the selection signal sig13 indicates selecting the MEMS driver 6 as the input destination, the selection signal sig13 will be input to the MEMS driver 6.

The self-diagnosis input circuit 5 outputs a test signal sig1 in a case where the self-diagnosis on the MEMS element 2 is performed. The test signal sig1 may be, for example, electrostatic attraction or a specific voltage pulse. When receiving the selection signal sig13, the self-diagnosis input circuit 5 outputs the test signal sig1 to the MEMS element 2.

Figure 3:
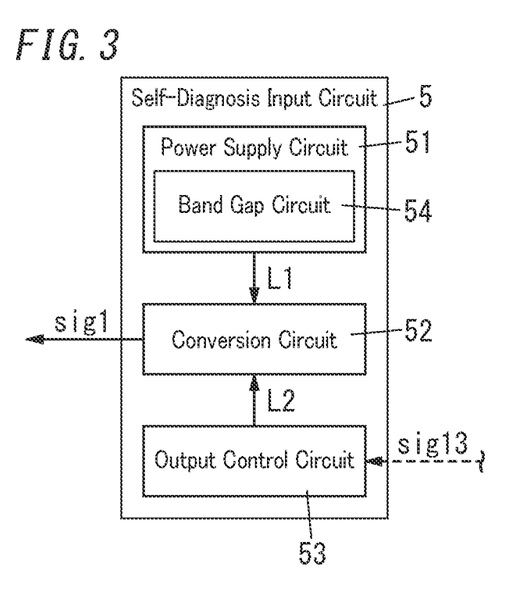
FIG. 3 is a block diagram of a self-diagnosis input circuit of the sensor system.
Figure 4:
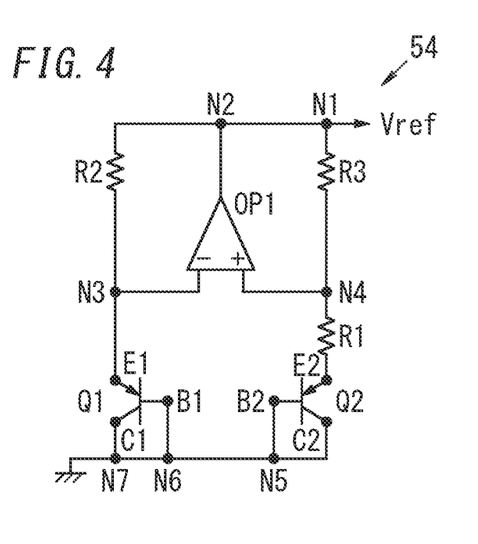
FIG. 4 illustrates an exemplary circuit configuration of a power supply circuit of the self-diagnosis input circuit.

FIG. 3 is a block diagram that shows an example of the self-diagnosis input circuit 5. As shown in FIG. 3, the self-diagnosis input circuit 5 includes a power supply circuit 51, a conversion circuit 52, and an output control circuit 53. The power supply circuit 51 generates an output signal. The conversion circuit 52 generates the test signal sig1 based on the output signal L1 coming from the power supply circuit 51. The output control circuit 53 outputs, in response to the selection signal sig13, an output control signal L2 instructing the conversion circuit 52 to output the test signal sig1. The power supply circuit 51 includes a band gap circuit 54 configured to reduce output fluctuation, due to change in temperature, of the output signal L1 outputted by the power supply circuit 51, for example. Specifically, the band gap circuit 54 can reduce variation in temperature characteristics in the test signal sig1. The band gap circuit 54 may be a circuit for outputting a reference voltage Vref. For example, as shown in FIG. 4, the band gap circuit 54 includes a combination of an operational amplifier (e.g., one operation amplifier OP1 in the example illustrated in FIG. 4), a resistor (e.g., three resistors R1, R2, and R3 in the example illustrated in FIG. 4), and a transistor (e.g., two transistors Q1 and Q2 in the example illustrated in FIG. 4). The band gap circuit 54 functions as a constant voltage circuit and generates the reference voltage Vref to output it. The reference voltage Vref is a voltage to be used as a reference for the output signal L1. The power supply circuit 51 generates the output signal L1, using, as the reference, the reference voltage Vref that has been generated and outputted by the band gap circuit 54.

In the band gap circuit 54, as shown in FIG. 4, the operational amplifier OP1 has an output terminal connected to a node N2. The node N2 is connected to the resistor R3 via a node N1, and the node N2 is connected to the resistor R2. The resistor R2 is connected to an inverting input terminal of the operational amplifier OP1 via a node N3. The resistor R3 is connected to a non-inverting input terminal of the operational amplifier OP1 via a node N4. The resistor R1 is connected to the node N4 and an emitter E2 of the transistor Q2. The transistor Q1 has an emitter E1 connected to the node N3. The transistor Q2 has a base B2 and a collector C2 connected with each other at a node N5. The transistor Q1 has a base B1 connected to the node N5 via a node N6. The transistor Q1 has a collector C1 connected to the node N6 via a node N7. The node N5, the node N6, and the node N7 are grounded.

In the band gap circuit 54 shown in FIG. 4, amounts of temperature compensation is adjusted by using resistance ratio and current ratio. So the two transistors Q1 and Q2 can be integrated into one chip wherein mismatch between properties of adjacent elements is relatively small. This design enables reducing temperature drift. As a result, using the band gap circuit 54 in an integrated circuit further enables reducing variation in temperature characteristics.

The MEMS driver 6 outputs the MEMS drive signal sig2 to drive the MEMS element 2. When receiving the selection signal sig13, the MEMS driver 6 outputs, to the MEMS element 2, the MEMS driver signal sig2 to drive the MEMS element 2.

The signal processing circuit 3 serves as a circuit that processes electric signals. The signal processing circuit 3 receives, from the MEMS element 2, the detection signal sig3 when an external force is measured, and receives the pseudo-signal sig4 when the self-diagnosis is performed. The signal processing circuit 3 converts the electric signal coming from the sensor element 2 into a signal having a certain signal format.

According to the present embodiment, when receiving the electric signal (e.g., the detection signal sig3) related to capacitance change of the MEMS element 2, the signal processing circuit 3 converts the received detection signal sig3 into a voltage signal. The signal processing circuit 3 outputs a detection signal sig6, which is the voltage signal thus converted, to the detection signal correction circuit 8, and receives a detection signal sig7, which has been corrected by the detection signal correction circuit 8. The signal processing circuit 3 outputs the received detection signal sig7, which has been corrected, as a detection signal sig9, to the user system 100 via the port 14 of the ASIC 9.

Meanwhile, when receiving the pseudo-signal sig4, the signal processing circuit 3 converts the electric signal related to capacitance change of the MEMS element 2 into a voltage signal. The signal processing circuit 3 outputs a pseudo-signal sig11, which is the voltage signal thus converted, to the pseudo-signal correction circuit 4. The signal processing circuit 3 receives a pseudo-signal sig12, which has been corrected by the pseudo-signal correction circuit 4, and outputs the received pseudo-signal sig12 as a pseudo-signal sig10 to the user system 100 via the port 14 of the ASIC 9.

In other words, the signal processing circuit 3 uses the same port 14 to output the detection signal sig9 and the pseudo-signal sig10. That is to say, the signal processing circuit 3 outputs different signals from the same port 14. Specifically, the signal processing circuit 3 is configured to output the pseudo-signal 10 and the electric signal (the detection signal sig9) which has been converted into the signal having the certain signal format, from the same port 14 by a time-division method.

The environment sensor 7 detects environment information. The environment information includes temperature information, which indicates temperatures in an environment where at least one of the MEMS element 2 or the signal processing circuit 3 is located. The environment where at least one of the MEMS element 2 or the signal processing circuit 3 is located includes a space (area) in which at least one of the MEMS element 2 or the signal processing circuit 3 is located. In addition, the environment where at least one of the MEMS element 2 or the signal processing circuit 3 is located may include surface temperatures of at least one of the MEMS element 2 or the signal processing circuit 3.

The environment sensor 7 measures a temperature in the environment where at least one of the MEMS element 2 or the signal processing circuit 3 is located, as a temperature of an element or circuit located in the environment among the MEMS element 2 and the ASIC 9. The environment sensor 7 is a temperature sensor 7 in the present embodiment, and will be described as the temperature sensor 7 hereinbelow. The temperature sensor 7 may be, for example, a silicon diode functioning as a semiconductor temperature sensor. The forward voltage of the silicon diode has temperature coefficient, so the forward voltage decreases as the temperature rises. Measuring a voltage across both ends of the silicon diode enables measuring the temperature. The silicon diode may be replaced with a PNP transistor.

The detection signal correction circuit 8 serves as a circuit that corrects the detection signal sig6. The detection signal correction circuit 8 receives the detection signal sig6 from the signal processing circuit 3. In the present embodiment, the detection signal correction circuit 8 receives, from the temperature sensor 7, a temperature signal sig5 representing the environment information including the temperature information that is a detected result of the temperature sensor 7. The detection signal correction circuit 8 corrects the detection signal sig6 based on the temperature signal sig5. The detection signal correction circuit 8 outputs the corrected detection signal sig6 as the detection signal sig7 to the signal processing circuit 3. That is to say, in the present embodiment, the detection signal correction circuit 8 corrects temperature dependence of the detection signal sig6.

The pseudo-signal correction circuit 4 serves as a circuit that corrects a result of the self-diagnosis. The pseudo-signal correction circuit 4 receives the pseudo-signal sig11 from the signal processing circuit 3. The pseudo-signal correction circuit 4 also receives a temperature signal sig8 from the temperature sensor 7. The pseudo-signal correction circuit 4 corrects the pseudo-signal sig11 based on the temperature signal sig8. The pseudo-signal correction circuit 4 outputs the corrected pseudo-signal sig11 as the pseudo-signal sig12 to the signal processing circuit 3. That is to say, in the present embodiment, the pseudo-signal correction circuit 4 corrects temperature dependence of the pseudo-signal sig11.

The pseudo-signal correction circuit 4 is designed such that the temperature characteristic of the pseudo-signal sig11 matches the temperature characteristic of an external force to be used as a reference. With regard to the correction coefficient of the pseudo-signal sig11, the sensitivity and the offset due to the pseudo-signal sig4 are obtained, when the temperature characteristic of the sensitivity and the offset of the detection signal sig3 are corrected in a process where sensor sensitivity of the MEMS element 2 is adjusted. A deviation amount between the sensitivity of the detection signal sig3 and the sensitivity of the pseudo-signal sig4 is derived from the following equation depending on their order. A deviation amount between the offset of the detection signal sig3 and the offset of the pseudo-signal sig4 is also derived from the following equation depending on their order. The results are stored in a non-volatile memory (not shown) of the ASIC 9.

Sensitivity of the detection signal=$(1+A_n T_n + A_{n-1} T_{n-1} + \ldots) \times$ the pseudo-signal;

Offset of the detection signal=offset of the pseudo-signal+ $B_m T_m + T_{m-1} T_{m-1} + \ldots$; and Detected pseudo-signal output=$(1+A_n T_n + A_{n-1} T_{n-1} + \ldots) \times$ the pseudo-signal+$B_m T_m + B_{m-1} T_{m-1} + \ldots$, where "A" represents a correction coefficient for sensitivity-temperature characteristics, "B" represents a correction coefficient for offset-temperature characteristic, "n" represents a correction order for sensitivity-temperature characteristic, and "m" represents a correction order for offset-temperature characteristics.

(3) Operation

Figure 5:
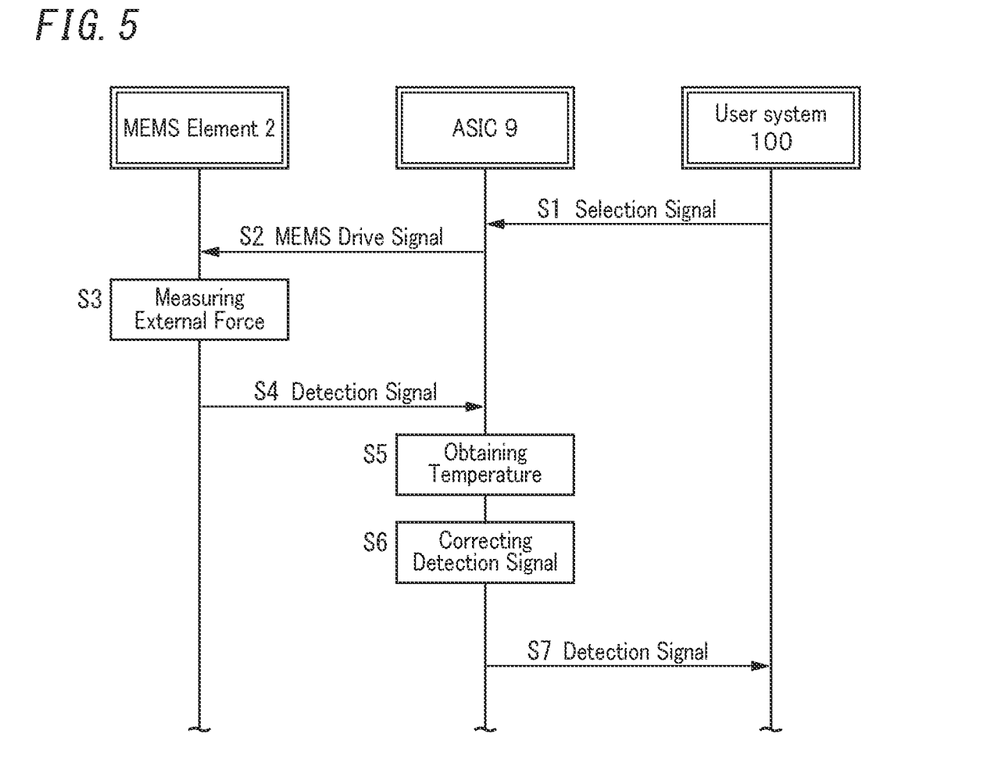
FIG. 5 is a sequence diagram illustrating an operation of measuring an external force by the sensor system.

The operation of the sensor system 1 will be described with reference to a sequence diagram in FIG. 5.

As shown in FIG. 1, the user system 100 supplies the selection signal sig13 to the ASIC 9. It means that the user system 100 determines whether the sensor system 1 will measure an external force or the sensor system 1 will perform a self-test.

The user system 100 outputs the selection signal sig13, which represents an instruction to select measuring an external force (in step S1). When receiving, from the user system 100, the selection signal sig13 that has been output in step S1, the MEMS driver 6 of the ASIC 9 outputs the MEMS drive signal sig2 to the MEMS element 2 in the semiconductor package 10 (in step S2).

When receiving the MEMS drive signal sig2, the MEMS element 2 measures the external force F (in step S3). The MEMS element 2 outputs the detection signal sig3, which indicates a measurement result of the external force F (in step S4).

The signal processing circuit 3 receives the detection signal sig3, which is an electric signal that has been outputted by the MEMS element 2, and converts it into a signal having a certain signal format (voltage in this embodiment), and then outputs the converted signal as the detection signal sig6 to the detection signal correction circuit 8.

The temperature sensor 7, which serves as an environment sensor for detecting environment information, measures temperature as environment information, and outputs the temperature signal sig5 to the detection signal correction circuit 8 (in step S5).

The detection signal correction circuit 8 corrects the detection signal sig6 based on the temperature signal sig5, and then outputs the corrected detection signal sig6 as the detection signal sig7 to the signal processing circuit 3 (in step S6).

The signal processing circuit 3 outputs the corrected detection signal sig9 to the user system 100 via the port 14 (in step S7).

Figure 6:
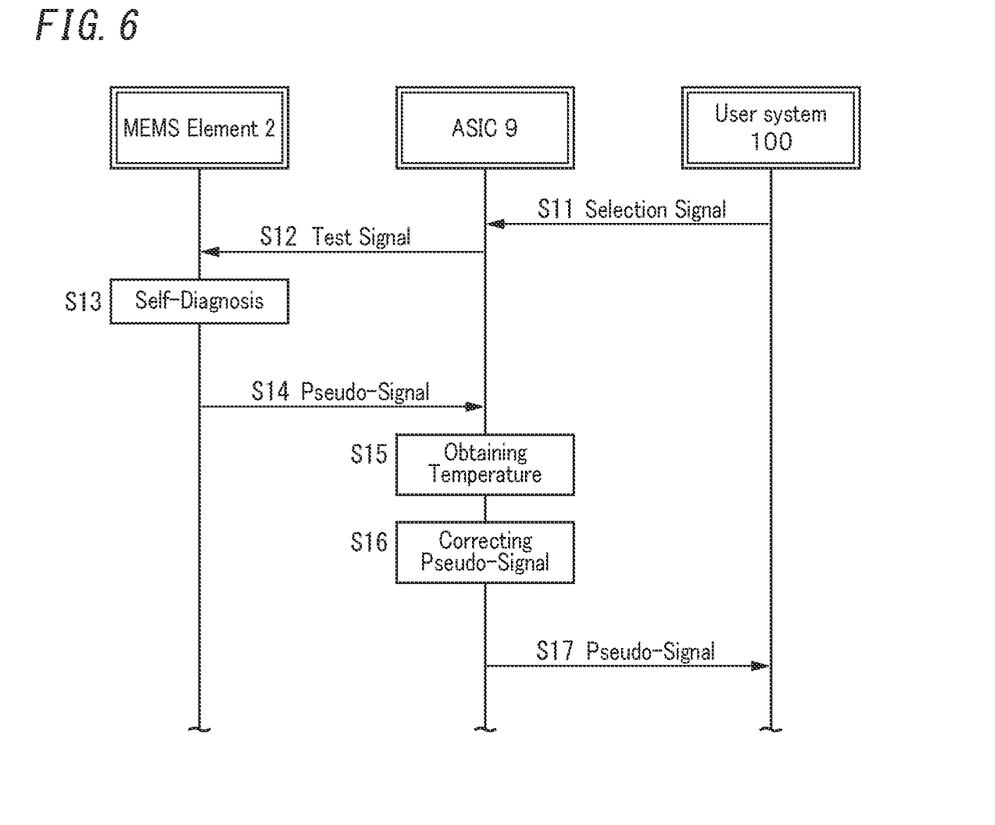
FIG. 6 is a sequence diagram illustrating an operation of self-diagnosis by the sensor system.

Next, a case will be described where the user system 100 has selected the self-diagnosis input circuit 5 with reference to a sequence diagram in FIG. 6.

The sensing method of the sensor system 1 includes outputting, by the sensor element 2, an electric signal corresponding to the external force F, and converting, by the signal processing circuit 3, the electric signal coming from the sensor element 2 into a signal having a certain signal format and outputting the converted signal. The sensing method further includes correcting, by the pseudo-signal correction circuit 4, the pseudo-signal outputted by the sensor element 2. The sensing method includes correcting, by the sensor element 2, the pseudo-signal based on environment information about an environment where at least one of the sensor element 2 or the signal processing circuit 3 is located.

The user system 100 outputs the selection signal sig13 to instruct to perform a self-test (in step S11). When receiving the selection signal sig13, the self-diagnosis input circuit 5 of the ASIC 9 outputs the test signal sig1 to the MEMS element 2 (in step S12).

When receiving the test signal sig1, the MEMS element 2 performs a self-diagnosis based on the test signal sig1 (in step S13). The MEMS element 2 outputs the pseudo-signal sig4, which indicates a result of the self-diagnosis, to the signal processing circuit 3 (in step S14). The MEMS element 2 changes a pseudo-response depending on voltage, for example.

The signal processing circuit 3 converts the pseudo-signal sig4, which is an electric signal, into a signal having a certain signal format (voltage in this embodiment), and then outputs the converted pseudo-signal sig4 as the pseudo-signal sig11 to the pseudo-signal correction circuit 4.

The temperature sensor 7 measures temperature as environment information, and then outputs the temperature signal sig8 to the pseudo-signal correction circuit 4 (in step S15).

The pseudo-signal correction circuit 4 corrects the received pseudo-signal sig11 based on the temperature signal sig8 (in step S16), and then outputs the corrected pseudo-signal sig11 as the pseudo-signal sig12 to the signal processing circuit 3.

The signal processing circuit 3 outputs the pseudo-signal sig12 to the user system 100 via the port 14 (in step S17).

As a result of these processing steps, the user system 100 can measure an external force and perform a self-test. It should be noted that, from the port 14, the detection signal and the pseudo-signal are outputted by a time-division method as described above.

(4) Examples of Self-Test

Examples of the self-test will be described.

Figure 7A:
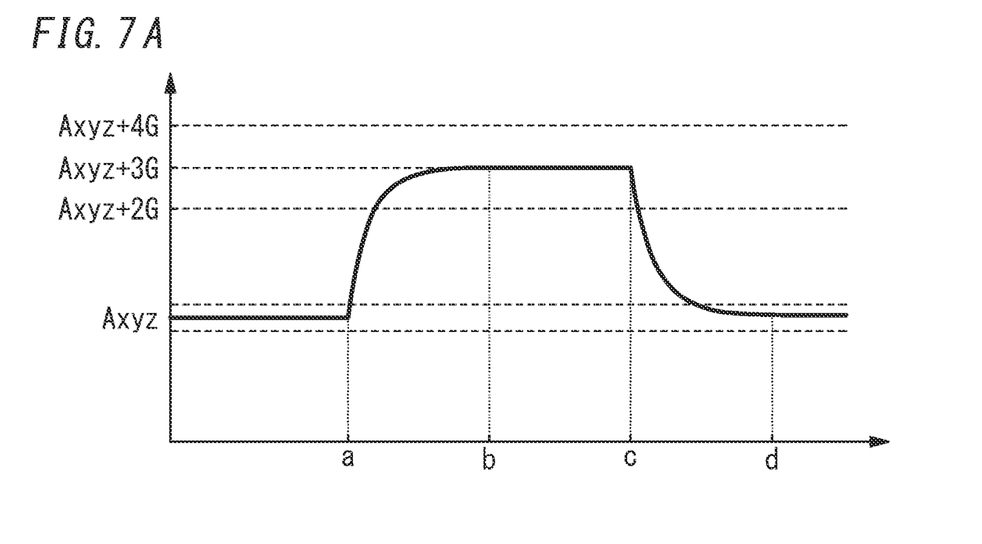
FIG. 7A illustrates time transition of signal levels of the sensor system when positive acceleration is applied to the sensor system.
Figure 7B:
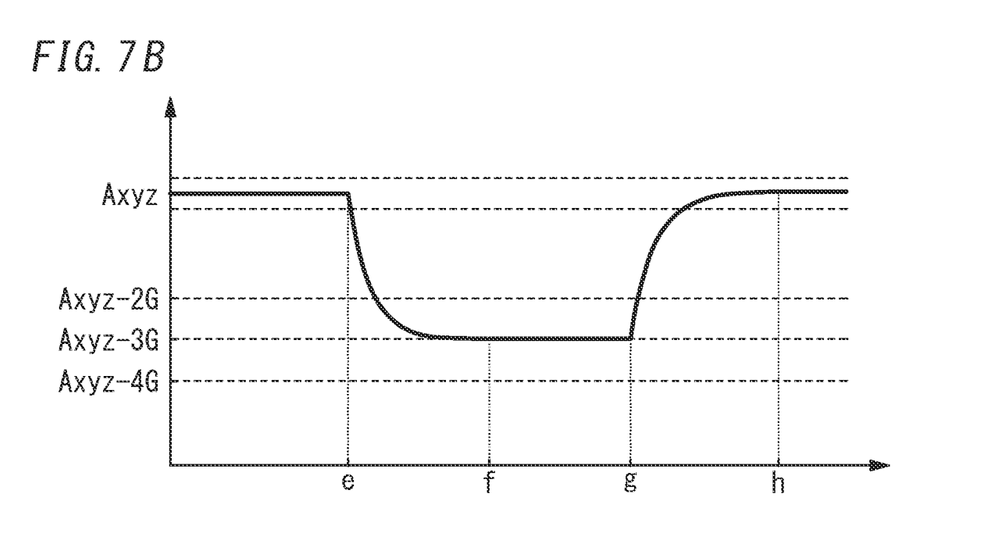
FIG. 7B illustrates time transition of signal levels of the sensor system when negative acceleration is applied to the sensor system.

The contents of the test signal are illustrated in FIG. 7A and FIG. 7B. The vertical axis indicates signal level, and the horizontal axis indicates time. It is assumed that the MEMS element 2 is detecting acceleration Axyz. In this case, Axyz means outputs of acceleration A in a XYZ coordinate. The X-axis component of the acceleration Axyz is referred to as AX, the Y-axis component of the acceleration Axyz is referred to as AY, and the Z-axis component of the acceleration Axyz is referred to as AZ. A response when the positive acceleration is applied is referred to as "Positive," and a response when the negative acceleration is be applied is referred to as "Negative."

A case will be described where a test signal corresponding to acceleration "+3G" ("G" represents gravitational acceleration) is further applied to the MEMS element 2 at acceleration Axyz. At time "a" in FIG. 7A, tests are simultaneously performed at all of X-axis, Y-axis, and Z-axis. That is to say, acceleration "Axyz+3G" is applied to the MEMS element 2. During a settling time between the time "a" and the time "b", the signal level reaches acceleration "Axyz+3G". Here, the settling time is time from when acceleration "+3G" is added to the acceleration Axyz to when the signal level reaches acceleration "Axyz+3G". The sensor system 1 determines whether or not the signal level reaches the final target value by judging, in the self-test, whether or not the amount of change in acceleration is within the specification range at time "b". The sensor system 1 determines whether or not the signal level reaches the final target value by confirming whether or not the settling time is within the specification range.

Next, at time "c", the self-test is cancelled. In the settling time after time "c", e.g., at time "d" in FIG. 7A, the applied acceleration "+3G" has been cancelled and the signal level of the MEMS element 2 has returned to the acceleration Axyz. The sensor system 1 determines whether or not the signal level reaches acceleration Axyz as the final target value by judging whether or not the settling time from time "c" to time "d" is within the specification range and by confirming whether or not the settling time is within the specification range. If the characteristic of the MEMS element 2 during this test is within the specification range, it is confirmed as a result of the self-test that the acceleration sensor properly operates.

Next, a case will be described where a test signal corresponding to acceleration "−3G" is applied. The test signal is shown in FIG. 7B. A self-test is started at time "e" in FIG. 7B at all of X-axis, Y-axis, and Z-axis. Sensitivity of the MEMS element 2 changes from acceleration Axyz to acceleration "Axyz −3G", during a period from time "e" to time "f" as the settling time. Next, at time "g", the self-test is cancelled. From time "g" to time "h" as the settling time, e.g., at time "h" in FIG. 7B, the applied acceleration "−3G" is cancelled, and the signal level of the acceleration sensor returns to acceleration Axyz. If the characteristic of the acceleration sensor is within the specification range, it is confirmed as a result of the self-test that the acceleration sensor properly operates.

(5) Temperature Characteristic of Sensitivity and Offset in a Comparison Example Temperature characteristics of the sensitivity and the offset will be described with reference to FIG. 8A-FIG. 8F. In comparison examples, the ASIC includes a detection signal correction circuit, but does not include a pseudo-signal correction circuit. Therefore, the ASIC of the comparison example cannot correct the pseudo-signal according to the environment.

In contrast, according to the present embodiment, the ASIC 9 can correct the pseudo-signal sig4 according to the environment. For example by confirming the pseudo-response of the MEMS element in Positive (applying +3G) and Negative (applying −3G) directions as shown in FIG. 7A and FIG. 7B and performing the following calculation, the sensitivity and the offset will be calculated in a pseudo manner using a function of the self-diagnosis. The measurements are performed at temperatures of −40° C., 25° C., and 125° C.

$$\text{Offset}=(\text{Positive output}+\text{Negative output})/2$$

$$\text{Sensitivity}=(\text{Positive output}-\text{Negative output})/2/\text{Normalization coefficient}$$

Normalization coefficient represents a numerical value which is obtained by normalizing, based on gravitational acceleration, an absolute value of the applied acceleration. For example, if the pseudo-response is ±3G, the normalization coefficient is "3".

Figures 8A, 8B, 8D, 8E:
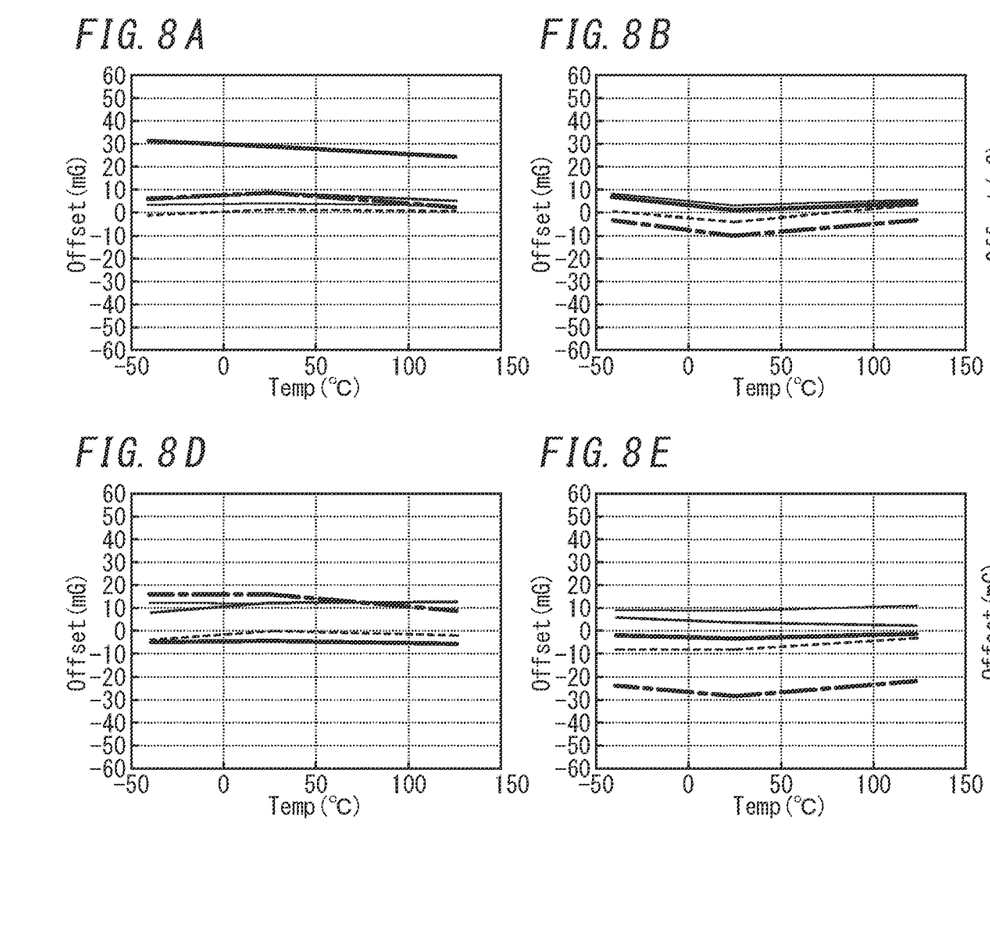
FIGS. 8A-8C illustrate a temperature characteristic of offset when an external force is applied.
FIGS. 8D-8F illustrate a temperature characteristic of offset of the self-diagnosis.
Figures 8C, 8F:
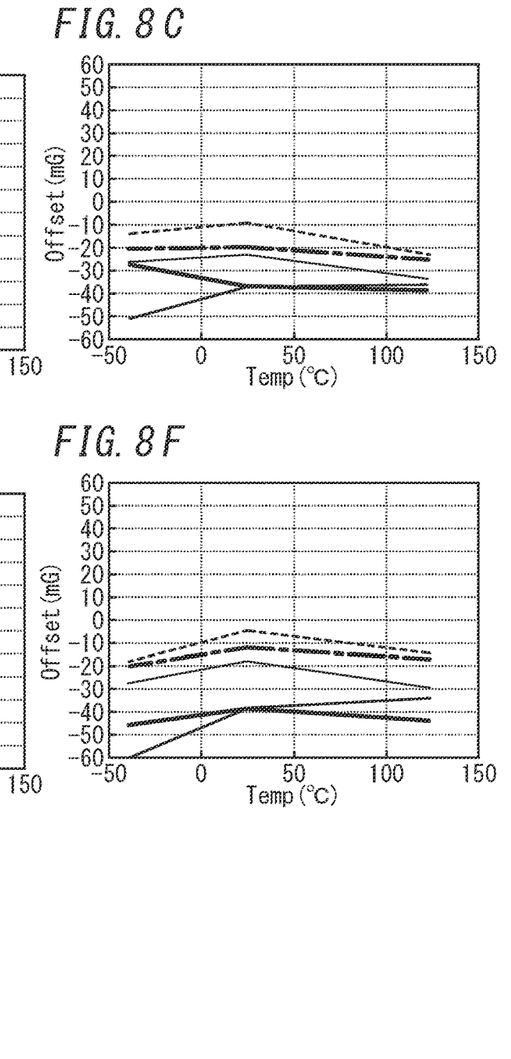

FIG. 8A-FIG. 8C illustrate offsets that are obtained by applying an external force corresponding to the gravitational acceleration ±1G. FIG. 8A illustrates the X-axis direction offset, FIG. 8B illustrates the Y-axis direction offset, and FIG. 8C illustrates the Z-axis direction offset. FIG. 8D-FIG. 8F illustrate offsets of a conventional example that are calculated by a self-diagnosis in which acceleration ±3G is applied. In this case, the ASIC is provided with no pseudo-signal correction circuit. FIG. 8D illustrates the X-axis direction offset using a result of the self-diagnosis, FIG. 8E illustrates the Y-axis offset using a result of the self-diagnosis, and FIG. 8F illustrates the Z-axis offset using a result of the self-diagnosis.

Temperature characteristics of offsets (see FIG. 8A-FIG. 8C) obtained based on the applied external force and conventional offsets (see FIG. 8D-FIG. 8F) calculated using a self-diagnosis function have a relatively high correlation, but their characteristics are not matched. Accordingly, the user system is needed to apply an external force in the inspection process. In order to do so, inspection facilities having an operating mechanism is necessary, thereby increasing load on the user system.

In contrast, according to the present embodiment, the ASIC 9 corrects the pseudo-signal sig4 according to the environment (e.g., the temperature). Accordingly, temperature characteristic of the offset according to the present embodiment has a high correlation with the offset calculated by applying gravitational acceleration ±1G as an external force, i.e., their characteristics almost match.

Next, sensitivity will be described.

Figure 9A:
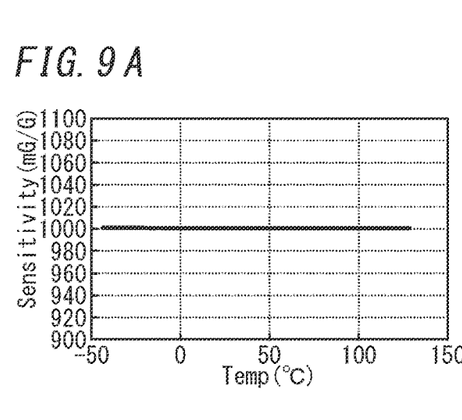
FIGS. 9A-9C illustrate a temperature characteristic of sensitivity when an external force is applied.
Figure 9B:
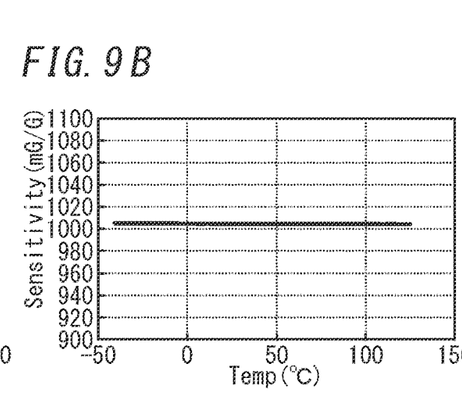
Figure 9C:
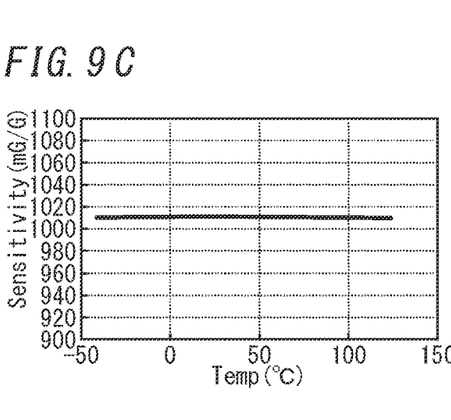
Figure 9D:
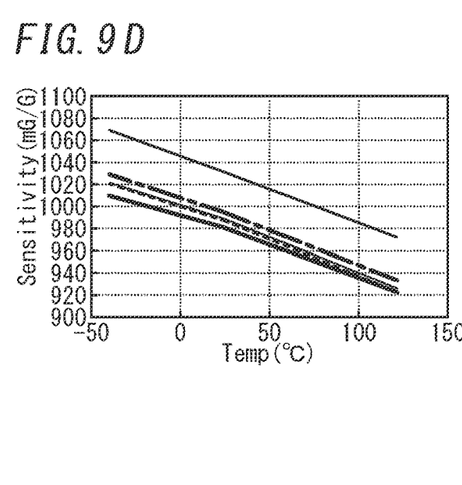
FIGS. 9D-9F illustrates a temperature characteristic of sensitivity of the self-diagnosis.
Figure 9E:
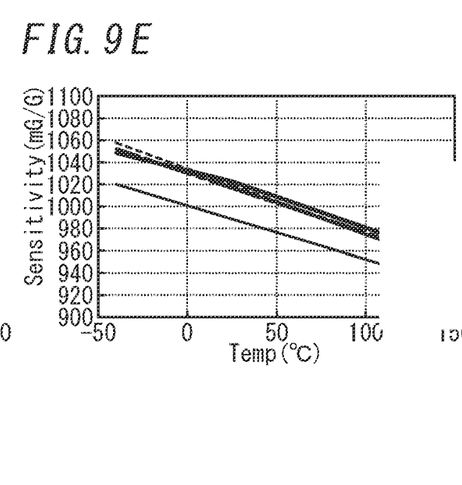
Figure 9F:
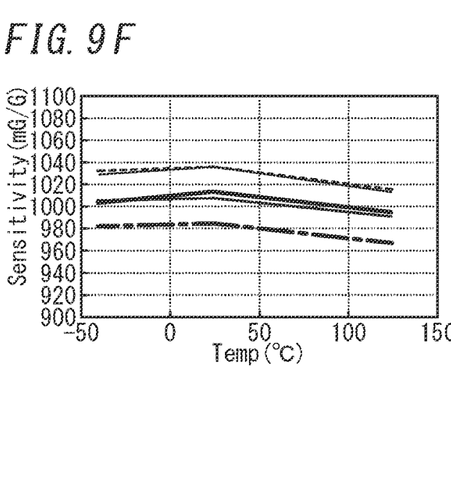

FIG. 9A-FIG. 9C illustrate the respective sensitivities obtained by applying an external force corresponding to gravitational acceleration ±1G. FIG. 9A illustrates the X-axis direction sensitivity when an external force is applied, FIG. 9B illustrates the Y-axis direction sensitivity when an external force is applied, and FIG. 9C illustrates the Z-axis direction sensitivity when an external force is applied. FIG. 9D-FIG. 9F illustrate respective sensitivities in the comparison example calculated by the self-diagnosis in which acceleration ±3G is applied. In this case, the ASIC of the comparison example is provided with no pseudo-signal correction circuit. FIG. 9D illustrates the X-axis direction sensitivity using a result of the self-diagnosis, FIG. 9E illustrates the Y-axis direction sensitivity using a result of the self-diagnosis, and FIG. 9F illustrates the Z-axis direction sensitivity using a result of the self-diagnosis.

Sensitivities (see FIG. 9A-FIG. 9C) obtained based on the applied external force and sensitivities (see to FIG. 9D-FIG. 9F) calculated using the self-diagnosis results have a low correlation in temperature characteristics. Assumingly, the reason is that, in the self-diagnosis, voltage, which is applied as a test signal, varies depending on temperature. In particular, as shown in FIG. 8D and FIG. 8E, they are remarkably deviated at a low temperature (−40° C.) and a high temperature (125° C.). For sensitivity, assumingly, since the difference between Positive output and Negative output is calculated as described above, errors increase at a low temperature and a high temperature, as a result, the sensitivity calculated based on measurement result of the external force and the sensitivity calculated using the self-diagnosis are remarkably deviated.

In contrast, according to the present embodiment, the ASIC 9 corrects the pseudo-signal sig4 according to the environment (e.g., the temperature). Accordingly, sensitivity according to the present embodiment and sensitivity calculated by applying the gravitational acceleration ±1G as an external force has a high correlation in temperature characteristics, i.e., their characteristics almost match.

In conclusion, according to the present embodiment, the ASIC 9 includes a circuit that performs the temperature correction on the pseudo-signals. In the present embodiment, the installment of the pseudo-signal correction circuit 4 enables correcting temperature dependence of the offset and the sensitivity. Accordingly, the offset and the sensitivity calculated by actually applying an external force; and the offset and the sensitivity calculated using the self-diagnosis matches each other highly accurately compared to a case where the temperature correction is not performed. As a result, the need for actually applying an external force in the inspection process of the user system 100 is eliminated when performing an inspection, thus reducing the load on the user system 100.

(6) Advantageous Effects

The sensor system 1 includes the sensor element 2, the signal processing circuit 3, and the pseudo-signal correction circuit 4. The sensor element 2 outputs an electric signal corresponding to an external force. The signal processing circuit 3 converts the electric signal coming from the sensor element 2 into a signal having a certain signal format, and outputs the converted signal. The pseudo-signal correction circuit corrects the pseudo-signal outputted by the sensor element 2. When receiving a test signal, the sensor element 2 performs a self-diagnosis based on the test signal, and then outputs a pseudo-signal representing a result of the self-diagnosis. The pseudo-signal correction circuit 4 corrects the pseudo-signal based on environment information about an environment where at least one of the sensor element 2 or the signal processing circuit 3 is located.

This configuration provides a sensor system that can improve precision of the pseudo-signal generated by a self-test.

In the inspection facilities for the system, without actually inputting, for inspection, an external force to a substrate on which the MEMS element 2 is mounted, the system can be inspected based on a pseudo-signal generated by utilizing a self-test function of the sensor. As a result, the need for the drive mechanism of the inspection facilities of the system is eliminated.

(7) Variations

Next, variations of the embodiment will be enumerated one after another. The variations to be described below may be combined as appropriate with the embodiment described above.

In the embodiment, all three axes of the MEMS element 2 are used. However, this is only an example and should not be construed as limiting. Alternatively, the ASIC 9 may use a result of one or two axes of the 3-axis inertial sensors. Specifically, the ASIC 9 may use a result of at least one of the first inertial sensor element 11, the second inertial sensor element 12, or the third inertial sensor element 13.

In the embodiment, the self-diagnosis is driven by using the test signal sig1, which is a voltage signal. However, this is only an example and should not be construed as limiting. Alternatively, the test signal sig1 may be a current signal instead of a voltage signal.

In the embodiment, the MEMS element 2 is an inertial sensor that detects an inertial force as an external force. However, this is only an example and should not be construed as limiting. Alternatively, for example, the MEMS element 2 may be a transducer that converts a pressure into an electric signal.

In the embodiment, the temperature correction is performed. However, this is only an example and should not be construed as limiting. Alternatively, for example, durable fluctuation (reliability), humidity and other physical quantities may be used. For durable fluctuation, it is assumed that not only the ASIC 9 and the MEMS element 2 but also the whole of the semiconductor package 10 deteriorates. For durable fluctuation of the ASIC 9, which outputs the pseudo-signal, aging since they start using the ASIC 9 poses a problem. For example, by comparing the pseudo-signals between a state of the ASIC 9 after one week, a state of the ASIC 9 after one month, and a state of the ASIC 9 after one year, the correction depending on the change can be added to the pseudo-signals. That is to say, aging may be used as the environment information for the correction. When performing a self-diagnosis using a pseudo-signal, since factors that are not superimposed on the pseudo-signals but affect the external force are not reflected, the detection signal and the pseudo-signal have been deviated. Therefore, by superimposing a factor that normally should not be superimposed on pseudo-signals, such as temperature, humidity, and aging, on the pseudo-signals for correction, the same results are obtained as the detection signals.

Note that the embodiment described above is only an exemplary one of various embodiments of the present disclosure and should not be construed as limiting. Rather, the exemplary embodiment may be readily modified in various manners depending on a design choice or any other factor without departing from the scope of the present disclosure. The functions of the sensor system 1 may also be implemented as, for example, a sensing method, a computer program, or a non-transitory storage medium that stores the computer program. A sensing method of the sensor system 1 according to one aspect includes: outputting, by the MEMS element 2, an electric signal corresponding to an external force; converting, by the signal processing circuit 3, the electric signal coming from the MEMS element 2 into a signal having a certain signal format and outputting the converted signal; and correcting, by the pseudo-signal correction circuit 4, the pseudo-signal outputted by the MEMS element 2. The sensing method further includes correcting, by the MEMS element 2, the pseudo-signal based on environment information about an environment where at least one of the MEMS element 2 or the signal processing circuit 3 is located.

A program according to still another aspect is a program that causes a computer system to function as the described sensor system 1 or sensing method for the sensor system 1.

The sensor system 1 according to the present disclosure includes a computer system. The computer system may include a processor and a memory as principal hardware components. The functions of the sensor system 1 according to the present disclosure may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The ASIC 9 may be implemented as a single or a plurality of electronic circuits including a semiconductor integrated circuit (IC) or a large-scale integrated circuit (LSI). As used herein, the "integrated circuit" such as an IC or an LSI is called by a different name depending on the degree of integration thereof. Examples of the integrated circuits include a system LSI, a very large-scale integrated circuit (VLSI), and an ultra-large scale integrated circuit (ULSI). Optionally, a field-programmable gate array (FPGA) to be programmed after an LSI has been fabricated or a reconfigurable logic device allowing the connections or circuit sections inside of an LSI to be reconfigured may also be adopted as the ASIC 9. Those electronic circuits may be either integrated together on a single chip or distributed on multiple chips, whichever is appropriate. Those multiple chips may be integrated together in a single device or distributed in multiple devices without limitation.

Likewise, the signal processing circuit 3, the self-diagnosis input circuit 5, the MEMS driver 6, the temperature sensor 7, the detection signal correction circuit 8, and the pseudo-signal correction circuit 4 do not have to be installed on the same ASIC 9. They may be distributed in multiple different ASICs. Furthermore, the MEMS element 2 and the ASIC 9 do not have to be installed on the same semiconductor package 10. Alternatively, they may be installed on different packages.

The sensing method may be implemented by a computer. That is to say, the sensing method may be implemented by a program that causes the computer to perform the sensing method.

(Recapitulation)

As can be seen from the foregoing description, a sensor system (1) according to a first aspect includes a sensor element (2), a signal processing circuit (3), and a pseudo-signal correction circuit (4). The sensor element (2) is configured to output an electric signal corresponding to an external force. The signal processing circuit (3) is configured to convert the electric signal coming from the sensor element (2) into a signal having a certain signal format and output the signal thus converted. The pseudo-signal correction circuit (4) is configured to correct a pseudo-signal (sig4) outputted by the sensor element (2). The sensor element (2) is configured to perform, when receiving a test signal (sig1), a self-diagnosis based on the test signal (sig1), and then output the pseudo-signal (sig4), which represents a result of the self-diagnosis. The pseudo-signal correction circuit (4) is configured to correct the pseudo-signal (sig4) based on environment information about an environment where at least one of the sensor element (2) or the signal processing circuit (3) is located.

This configuration enables providing the sensor system (1) in which precision of the pseudo-signal (sig4), which is obtained by the self-test, is improved. The improved precision of the pseudo-signal (sig4) allows users of the sensor system (1) to inspect the user system (100) without actually applying an external force, which simplifies the inspection process.

The sensor system (1) according to a second aspect, which may be implemented in conjunction with the first aspect, further includes a self-diagnosis input circuit (5) configured to output the test signal (sig1). The self-diagnosis input circuit (5) includes a power supply circuit (51), a conversion circuit (52), and an output control circuit (53). The power supply circuit (51) is configured to generate an output signal (L1). The conversion circuit (52) is configured to generate a test signal (sig1) based on an output signal (L1) from the power supply circuit (51). The output control circuit (53) is configured to instruct the conversion circuit (52) to output the test signal (sig1). Th power supply circuit (51) includes a band gap circuit (54) that is configured to reduce output fluctuation, due to change in temperature, of the output signal (L1) to be outputted by the power supply circuit (51).

This configuration enables reducing output fluctuation of change in temperature of the output signal (L1), which is supplied from the power supply circuit (51) of the self-diagnosis input circuit (5), thus reducing output fluctuation of the test signal (sig1), which is generated from the output signal (L1).

The sensor system (1) according to a third aspect, which may be implemented in conjunction with the first or second aspect, further includes an environment sensor (7) configured to detect the environment information.

This configuration allows the pseudo-signal correction circuit (4) to perform a correction highly precisely by detecting the environment information.

In the sensor system (1) according to a fourth aspect, which may be implemented in conjunction with any one of the first to third aspects, the environment information includes information about a temperature in the environment.

This configuration enables reducing the chances of causing a decline in precision of the pseudo-signal (sig4) due to temperature. Here, the chances of causing a decline in precision of the pseudo-signal (sig4) means that sensitivity and offset calculated by actually applying an external force are deviated from sensitivity and offset calculated by a self-diagnosis.

In the sensor system (1) according to a fifth aspect, which may be implemented in conjunction with any one of the first to fourth aspects, the sensor element (2) includes a first inertial sensor element (11), a second inertial sensor element (12), and a third inertial sensor element (13). The first inertial sensor element (11) is configured to detect an inertial force along a first detection axis (X). The second inertial sensor element (12) is configured to detect an inertial force along a second detection axis (Y) perpendicular to the first detection axis (X). The third inertial sensor element (13) is configured to detect an inertial force along a third detection axis (Z) perpendicular to each of the first detection axis (X) and the second detection axis (Y). The sensor element (2) is configured to output the pseudo-signal by using an output result of at least one of the first inertial sensor element (11), the second inertial sensor element (12), or the third inertial sensor element (13).

This configuration enables reducing the load on the inspection process of the user system (100). The reason is that an inspection in which an external force is applied is omitted since the sensor system (1) employs one or more axes so that its precision is improved by the correction. In particular, if the sensor system (1) employs multiple axes for the correction, the load on the inspection process is remarkably reduced.

In the sensor system (1) according to a sixth aspect, which may be implemented in conjunction with the fifth aspect, the sensor element (2) is configured to output a pseudo-signal (sig4) for each of the first detection axis (X), the second detection axis (Y), and the third detection axis (Z).

This configuration enables dealing with a case where orders of the correction are different for each axis since this can output pseudo-signals (sig4) for each axis. In addition, dealing with a case where orders of the correction are different enables improving precision of the pseudo-signals (sig4).

In the sensor system (1) according to a seventh aspect, which may be implemented in conjunction with any one of the first to sixth aspects, the signal processing circuit (3) is configured to output the pseudo-signal and the electric signal which has been converted into the signal having the certain signal format, from one port (14) of the sensor system (1) by a time-division method.

This configuration enables detecting, at one port by a time-division method, the pseudo-signal and electric signal that has been converted into the signal having a certain signal format, which increases usability.

A sensing method according to an eighth aspect, includes: outputting, by a sensor element (2), an electric signal corresponding to an external force; converting, by a signal processing circuit (3), the electric signal coming from the sensor element (2) into a signal having a certain signal format and outputting the signal thus converted; and correcting, by a pseudo-signal correction circuit (4), a pseudo-signal outputted by the sensor element (2). The sensing method includes correcting, by the sensor element (2), a pseudo-signal based on environment information about an environment where at least one of the sensor element (2) or the signal processing circuit (3) is located.

This sensing method enables providing the sensor system (1) in which precision of the pseudo-signal, which is obtained by the self-test, is improved.

A program according to a ninth aspect is a program that is designed to cause a computer to perform the sensing method according to the eighth aspect.

This program enables providing the sensor system (1) in which precision of the pseudo-signal, which is obtained by the self-test, is improved.

REFERENCE SIGNS LIST

1 Sensor System
2 Sensor Element (MEMS Element)
3 Signal Processing Circuit
4 Pseudo-signal Correction Circuit
5 Self-Diagnosis Input Circuit
51 Power Supply Circuit
52 Conversion Circuit
53 Output Control Circuit
54 Band Gap Circuit
7 Environment Sensor (Temperature Sensor)
11 First Inertial Sensor Element
12 Second Inertial Sensor Element
13 Third Inertial Sensor Element
14 Port
X First Detection Axis
Y Second Detection Axis
Z Third Detection Axis

The invention claimed is:

1. A sensor system comprising:
a sensor element configured to output an electric signal corresponding to an external force;
a signal processing circuit configured to convert the electric signal coming from the sensor element into a signal having a certain signal format and output the signal thus converted;
a pseudo-signal correction circuit configured to correct a pseudo-signal outputted by the sensor element; and
a self-diagnosis input circuit,
the sensor element being configured to perform, when receiving a test signal, a self-diagnosis based on the test signal, and then output the pseudo-signal, which represents a result of the self-diagnosis,
the pseudo-signal correction circuit being configured to correct the pseudo-signal based on environment information about an environment where at least one of the sensor element or the signal processing circuit is located,
the self-diagnosis input circuit being configured to output the test signal,
the self-diagnosis input circuit including a power supply circuit configured to generate an output signal, a conversion circuit configured to generate the test signal based on the output signal coming from the power supply circuit, and an output control circuit configured to instruct the conversion circuit to output the test signal, and
the power supply circuit including a band gap circuit configured to reduce output fluctuation, due to change in temperature, of the output signal to be outputted by the power supply circuit.

2. The sensor system of claim 1, further comprising an environment sensor configured to detect the environment information.

3. The sensor system of claim 1, wherein the environment information includes information about a temperature in the environment.

4. The sensor system of claim 1, wherein
the sensor element includes:
a first inertial sensor element configured to detect an inertial force along a first detection axis;
a second inertial sensor element configured to detect an inertial force along a second detection axis perpendicular to the first detection axis; and
a third inertial sensor element configured to detect an inertial force along a third detection axis perpendicular to each of the first detection axis and the second detection axis,
the sensor element being configured to output the pseudo-signal by using an output result of at least one of the first inertial sensor element, the second inertial sensor element, or the third inertial sensor element.

5. The sensor system of claim 4, wherein the sensor element is configured to output the pseudo-signal for each of the first detection axis, the second detection axis, and the third detection axis.

6. The sensor system of claim 1, wherein
the sensor system is configured to selectively measure the external force or perform the self-diagnosis based on a selection signal received from a user system, the selection signal representing an instruction to select measuring the external force or performing the self-diagnosis, and
the signal processing circuit is configured to output the pseudo-signal representing the result of the self-diagnosis and the electric signal, indicating a measurement result of the external force, which has been converted into the signal having the certain signal format, from one port of the sensor system to the user system by a time-division method.

7. A sensing method comprising:
outputting, by a sensor element, an electric signal corresponding to an external force;
converting, by a signal processing circuit, the electric signal coming from the sensor element into a signal having a certain signal format and outputting the signal thus converted,
correcting, by a pseudo-signal correction circuit, a pseudo-signal outputted by the sensor element, the sensor element being configured to perform, when receiving a test signal, a self-diagnosis based on the test signal, and then output the pseudo-signal, which represents a result of the self-diagnosis;
correcting, by the pseudo-signal correction circuit, the pseudo-signal based on environment information about an environment where at least one of the sensor element or the signal processing circuit is located;
outputting, by a self-diagnosis input circuit, the test signal;
generating, by a power supply circuit of the self-diagnosis input circuit, an output signal;
generating, by a conversion circuit of the self-diagnosis input circuit, the test signal based on the output signal coming from the power supply circuit;
instructing, by an output control circuit of the self-diagnosis input circuit, the conversion circuit to output the test signal; and
reducing, by a band gap circuit of the power supply circuit, output fluctuation, due to change in temperature, of the output signal to be outputted by the power supply circuit.

8. A non-transitory computer-readable tangible recording medium storing a program designed to cause a computer to perform the sensing method of claim 7.

* * * * *